United States Patent
Goh et al.

(10) Patent No.: US 12,363,263 B2
(45) Date of Patent: Jul. 15, 2025

(54) DYNAMICALLY SIZED SECURITY MONITORING REGION

(71) Applicant: MOTOROLA SOLUTIONS, INC., Chicago, IL (US)

(72) Inventors: Zhe Qian Goh, Simpang Ampat (MY); Nur Syahirah Syafinaz Mohd Yusoff, Tasek Gelugor (MY); Syed Isa Syed Idrus, Bayan Lepas (MY); Haziq Iqram Bin Mohammed Shafri, Chemor (MY); Boon Haur Oun, Bayan Lepas (MY); Sanjeevan Sritharan, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 135 days.

(21) Appl. No.: 18/053,404

(22) Filed: Nov. 8, 2022

(65) Prior Publication Data

US 2024/0155081 A1    May 9, 2024

(51) Int. Cl.
| | |
|---|---|
| *H04N 7/00* | (2011.01) |
| *G06V 20/54* | (2022.01) |
| *G08G 3/02* | (2006.01) |
| *H04N 7/18* | (2006.01) |

(52) U.S. Cl.
CPC ............ *H04N 7/183* (2013.01); *G06V 20/54* (2022.01); *G08G 3/02* (2013.01)

(58) Field of Classification Search
CPC ........ H04N 7/183; G06V 20/54; G06V 20/52; G08G 3/02; G08G 3/00; G01W 1/02; G01W 1/04; G01W 1/06; G08B 21/08; H04W 4/021; H04W 4/00; H04W 4/02; H04W 4/022; H04W 4/029; H04W 4/38; B63B 79/15; B63B 79/40; G01C 21/3807; G01C 21/203; G01S 19/34; G01S 19/42;

(Continued)

(56) References Cited

U.S. PATENT DOCUMENTS

| | | |
|---|---|---|
| 10,882,185 B2 | 1/2021 | Vu et al. |
| 2016/0165191 A1 | 6/2016 | Rasheed et al. |

(Continued)

FOREIGN PATENT DOCUMENTS

| | | | |
|---|---|---|---|
| CN | 101145200 A | * | 3/2008 |
| CN | 101859494 B1 | | 8/2013 |
| CN | 105096381 A | | 11/2015 |

(Continued)

OTHER PUBLICATIONS

Installation Guide Models: Oscar Racing Series Oscar Advanced Series, BSB Group, www.oscar-navigation.com, Mar. 2021.

*Primary Examiner* — Brian A Zimmerman
*Assistant Examiner* — Anthony D Afrifa-Kyei (57) ABSTRACT

A computer-implemented method includes making an analytics-based determination that a water vessel has moved from one region to another region. The computer-implemented method also includes changing, within a security system and responsive to the determining, security monitoring of the water vessel from a first monitoring mode to a second monitoring mode, and the second monitoring mode being more sensitive than the first monitoring mode in relation to a measured velocity of the water vessel being a conditionally defined trigger for at least one analytics-based alarm within the security system.

20 Claims, 8 Drawing Sheets

(58) Field of Classification Search
CPC .... G01S 5/0027; G05D 1/0206; G06Q 10/08; G06Q 10/0833; G07C 5/0825
See application file for complete search history.

(56) References Cited

U.S. PATENT DOCUMENTS

2017/0185847 A1    6/2017    Saptharishi et al.
2020/0339124 A1    10/2020    Vassilovski et al.

FOREIGN PATENT DOCUMENTS

| CN | 105678935 A | 6/2016 | | |
|---|---|---|---|---|
| CN | 107170295 A | 9/2017 | | |
| CN | 112037582 B1 | 8/2021 | | |
| WO | WO-0125725 A1 * | 4/2001 | ............ | B63B 43/18 |
| WO | WO-2021141338 A1 * | 7/2021 | ............ | G01S 17/86 |

* cited by examiner

DYNAMICALLY SIZED SECURITY MONITORING REGION

BACKGROUND

When large water vessels want to set anchor at a port dock, the process can be long and involves several stages. Before the final stages in such a process are reached, large water vessels need to make sure that they are not approaching the port dock too quickly. The frequency of incidents of large water vessels coming in too fast and hitting the port dock is alarming. When a large water vessel hits a dock unintentionally (or otherwise) it becomes a serious hazard that may result in human harm and casualties, disruptions to businesses and shipping customers, and also damages (e.g. fixed infrastructure damage, water vessel damages, etcetera) the repairs of which may result in very large amounts of money having to be spent.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method that includes initially detecting that a water vessel, having a mass and movable over a body of water, is present as a foreground object within at least one Field Of View (FOV) of a respective at least one camera. The body of water is a background object occupying a first region of the FOV. The computer-implemented method also includes carrying out analytics processing on at least one image that includes the water vessel, captured by the camera, to make an analytics-based estimation of the mass of the water vessel. The computer-implemented method also includes defining, based at least in part on the analytics-based estimation of the mass of the water vessel, vessel-specific boundaries of second and third regions that are sub-regions of the first region. The third region corresponds to a part of the body of water that is closer to a protected structure than the second region, and the protected structure is located at or physically connected to land abutting the body of water. The computer-implemented method also includes determining, by analytics and after the defining of the boundaries, that the water vessel has moved from the second region to the third region. The computer-implemented method also includes changing (responsive to the determining) security monitoring of the water vessel, within a security system, from a first monitoring mode to a second monitoring mode. The second monitoring mode is more sensitive than the first monitoring mode in relation to at least one of a measured velocity of the water vessel and a travel path of the water vessel being a conditionally defined trigger for at least one analytics-based alarm within the security system.

According to yet another example embodiment, there is provided a security system that includes at least one camera configured to capture images that include a water vessel. The security system also includes at least one processor communicatively coupled to the at least one camera. The at least one processor is configured to carry out a method that includes initially detecting that the water vessel, having a mass and movable over a body of water, is present as a foreground object within at least one FOV of the respective at least one camera. The body of water is a background object occupying a first region of the FOV. The method performable by the at least one processor also includes carrying out analytics processing on at least one image of the images to make an analytics-based estimation of the mass of the water vessel. The method performable by the at least one processor also includes defining, based at least in part on the analytics-based estimation of the mass of the water vessel, vessel-specific boundaries of second and third regions that are sub-regions of the first region. The third region corresponds to a part of the body of water that is closer to a protected structure than the second region, and the protected structure is located at or physically connected to land abutting the body of water. The method performable by the at least one processor also includes determining, by analytics and after the defining of the boundaries, that the water vessel has moved from the second region to the third region. The method performable by the at least one processor also includes, changing (responsive to the determining) security monitoring of the water vessel, within the security system, from a first monitoring mode to a second monitoring mode. The second monitoring mode is more sensitive than the first monitoring mode in relation to at least one of a measured velocity of the water vessel and a travel path of the water vessel being a conditionally defined trigger for at least one analytics-based alarm within the security system.

Each of the above-mentioned embodiments will be discussed in more detail below, starting with example system and device architectures of the system in which the embodiments may be practiced, followed by an illustration of processing blocks for achieving an improved technical method, system and computer program product for dynamically sizing security monitoring regions. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include foreground objects (i.e. humans, vehicles, animals, and other objects that are substantially non-stationary). Moreover, examples of objects may also include background objects (i.e. buildings, stationary signs, identifiable parts of a scene that are not foreground objects, etcetera).

Further advantages and features consistent with this disclosure will be set forth in the following detailed description, with reference to the figures.

Figure 1:
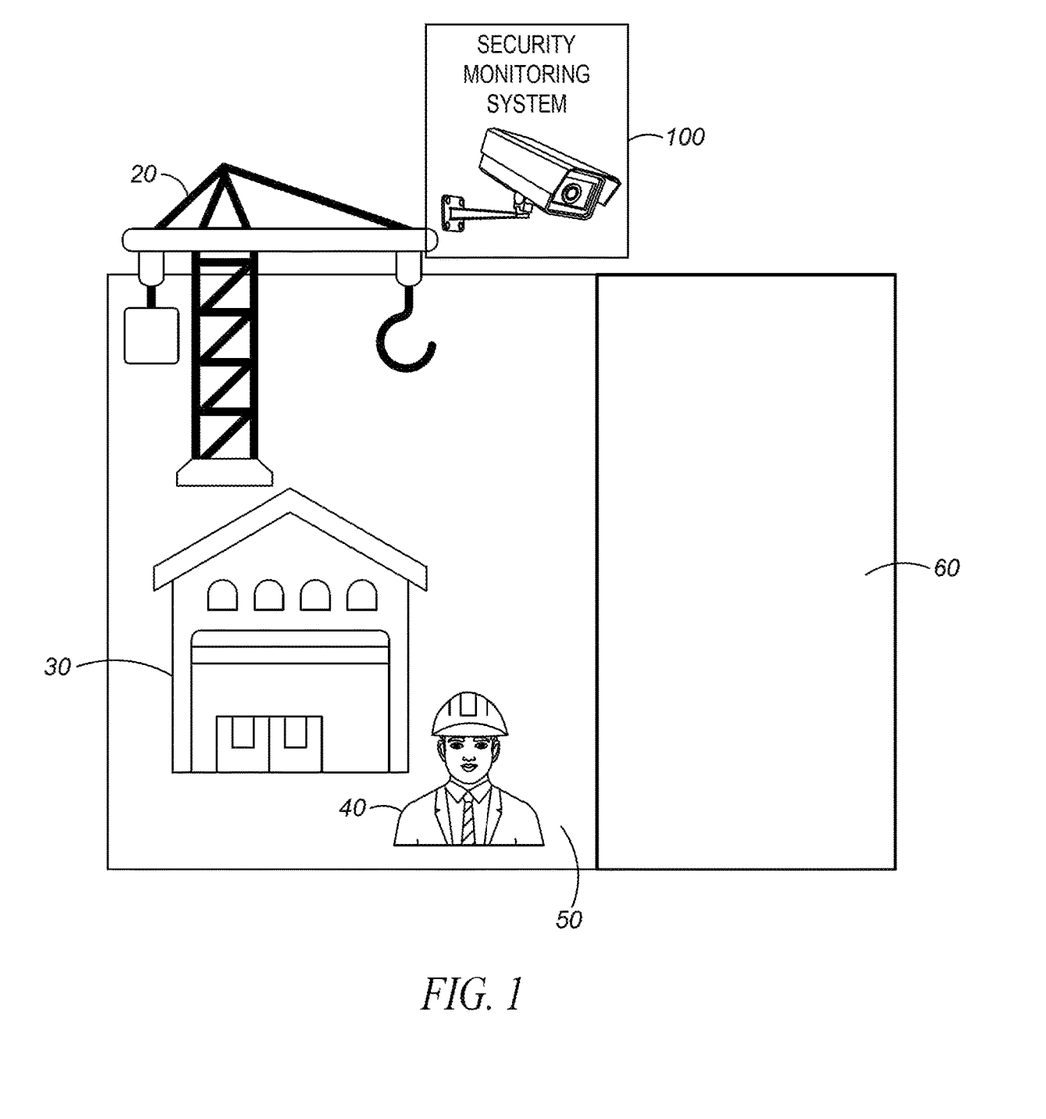
FIG. 1 is a diagram showing an example outdoor environment that includes property structures and person(s) located on land that abuts a body of water.

Referring now to the drawings, and in particular FIG. 1 which is a diagram of example property structures 20 and 30 and person(s) (represented by person icon 40) that are located on land 50 that abuts a body of water 60. A security monitoring system 100 may be installed proximate to the property structures and the people (as illustrated). Methods in accordance with example embodiments can be carried out within the security monitoring system 100 (as will be explained in more detail later herein).

Figure 2:
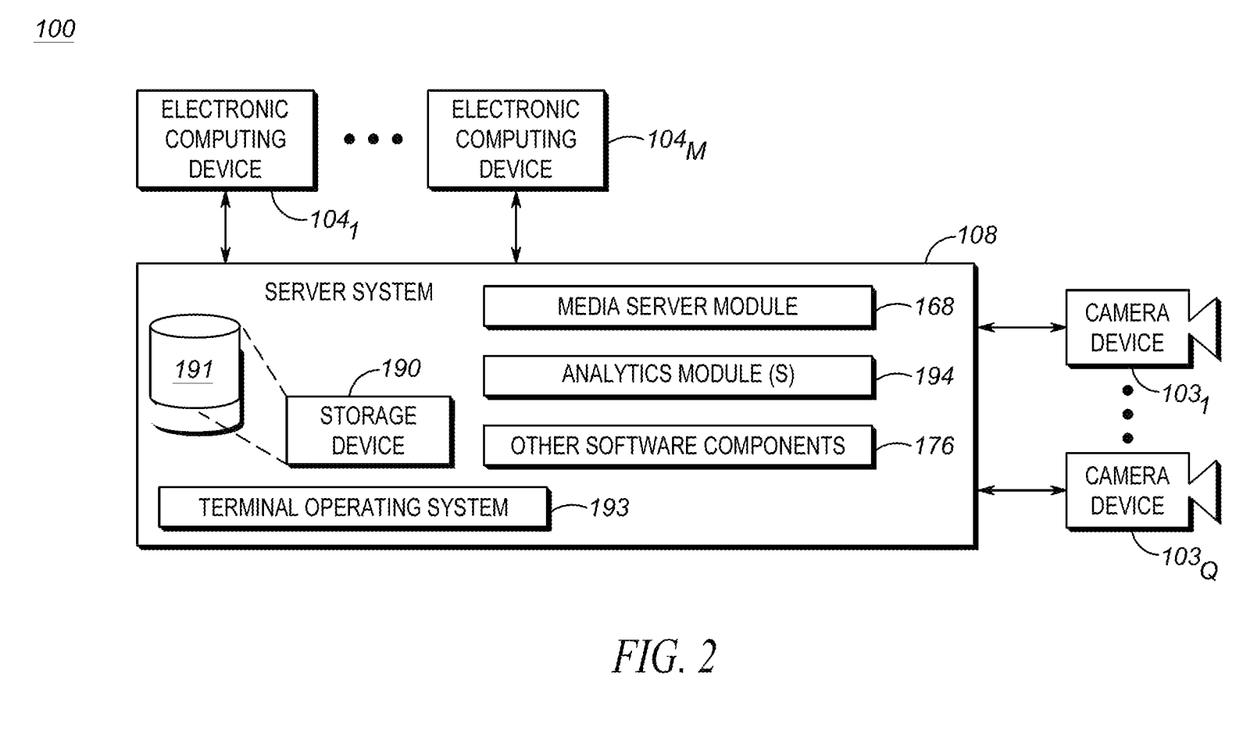
FIG. 2 is a block diagram showing, in accordance with an example embodiment, details of a security monitoring system that can be installed within the outdoor environment shown in FIG. 1.

Continuing on, FIG. 2 is a block diagram illustrating more details of the security monitoring system 100. The security monitoring system 100 includes a plurality of camera devices $103_1$-$103_Q$ (hereinafter interchangeably referred to as "cameras $103_1$-$103_Q$" when referring to all of the illustrated cameras, or "camera 103" when referring to any individual one of the plurality) where Q is any suitable integer greater than one. The security monitoring system 100 also includes a plurality of electronic computing devices $104_1$-$104_M$ (hereinafter interchangeably referred to as "electronic computing devices $104_1$-$104_M$" when referring to all of the illustrated computing devices, or "electronic computing device 104" when referring to any individual one of the plurality) where M is any suitable integer greater than one. The security monitoring system 100 also includes a server system 108.

In some example embodiments, the electronic computing device 104 is a personal computer system; however in other example embodiments the electronic computing device 104 is a selected one or more of the following: a handheld device such as, for example, a tablet, a phablet, a smart phone or a personal digital assistant (PDA); a laptop computer; a smart television; a two-way radio; marine communications device; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the electronic computing device 104 rather than within the server system 108.

The electronic computing device 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the electronic computing device 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the electronic computing device 104 and the server system 108 are within the same Local Area Network (LAN). In some examples, the electronic computing device 104 communicates directly or indirectly with other parts of security monitoring system 100 besides the server system 108. For instance, it is contemplated that the electronic computing device 104 may communicate directly or indirectly with one or more of the cameras $103_1$-$103_Q$.

Various suitable specific examples of the electronic computing device 104 have already been mentioned. The electronic computing device 104 may include at least one processor that controls the overall operation of the electronic computing device 104, and this processor may interact with various subsystems such as, for example, input devices (such as a selected one or more of a keyboard, mouse, touch pad, roller ball and voice control means, for example), random access memory (RAM), non-volatile storage, and display related subsystems that interact with a device display (including rendering graphics and/or text upon the display). The electronic computing device 104 may also include communications related hardware components such as one or more specialized signal processors, transmitter(s), etcetera.

The electronic computing device 104 may also include an operating system, communications related application(s), and various software applications (usable by the processor of the electronic computing device 104) and stored in the non-volatile storage of the electronic computing device 104. This non-volatile storage may be, for example, one or more hard disks, solid state drives, or some other suitable form of computer readable medium that retains recorded information after the electronic computing device 104 is turned off. Also, as appreciated by those skilled in the art, the operating system and other applications, or parts thereof, may be temporarily loaded into a volatile store such as the RAM of the electronic computing device 104.

Referring once again to FIG. 2, the server system 108 includes several software components for carrying out other functions of the server system 108. For example, the server system 108 includes a media server module 168. The media server module 168 handles client requests related to storage and retrieval of video taken by camera devices $103_1$-$103_q$ in the security monitoring system 100. In some examples, the media server module 168 may carry out other functions in relation to other forms of media communicated to the electronic computing device 104 from the server system 108.

The server system 108 also includes a terminal operating system 193, the functionality for which will vary depending on the requirements of the port facility that the terminal operating system 193 supports. In at least some examples, the terminal operating system 193 facilitates the reading, writing, erasing and/or modifying of data related to operations at the port facility, including one or more of the following: vessel arrival and departure data, data related to the status of goods, data related to locations, and data related to machines within the port facility.

The server system 108 also includes server-side analytics module(s) 194 which can include, in some examples, any suitable one of known commercially available software that carry out computer vision related functions (complementary to any analytics performed in the cameras) as understood by a person of skill in the art. The server-side analytics module(s) 194 can also optionally include software for carrying out analytics that operate on some sensor-generated data other than video/images, including but not limited to audio analytics that may, for example, extract data from data-over-sound, convert spoken words into text, carry out audio emotion recognition, etc.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The other software components 176 may also include one or more server-side modules that provide cooperative counterpart functionality to one or more communications related application(s) that run on one or more of the electronic computing devices $104_1$-$104_M$.

Regarding the at least one storage device 190, this comprises, for example, one or more databases 191 which may facilitate the organized storing of recorded video, images and other data (such as, for example, data that one might expect to be stored and maintained in a marine port facility including one or more of the following: vessel arrival and departure data, data related to the status of goods, data related to locations and machines for the port facility, etcetera) in accordance with example embodiments. The one or more databases 191 may also contain metadata related to, for example, the recorded video and/or images that are storable within one or more storages. The one or more databases 191 may also optionally contain other types of metadata besides video/image metadata. Examples of metadata other than video/image metadata, that may be stored in the one or more databases 191, include audio metadata, Global Positioning System (GPS) location metadata, etcetera.

Still with reference to FIG. 2, in such cases where the camera 103 includes video capture capability, the camera 103 will operate to capture a plurality of video frames and produce video data representing the plurality of captured video frames. The camera 103, a video and/or image capturing device, may include, for example, a security camera or some other suitable type of fixed or mobile camera. Furthermore, it will be understood that the security monitoring system 100 includes any suitable number of cameras (i.e. Q is any suitable integer greater than zero).

Figure 3:
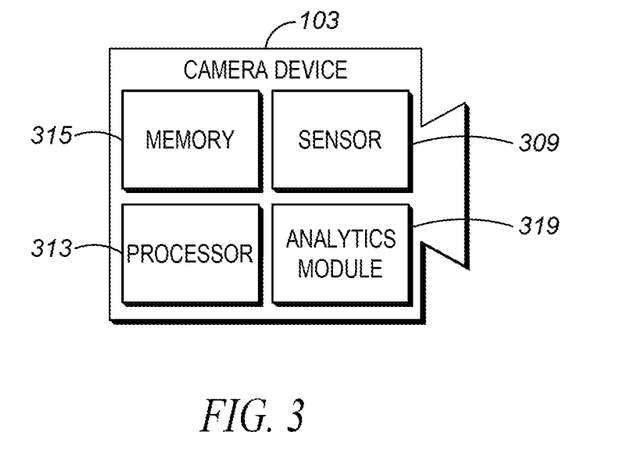
FIG. 3 is a block diagram showing more detail of one of the cameras shown in FIG. 2.

More details of the camera 103 are shown in FIG. 3. The camera 103 includes an image sensor 309 for capturing a plurality of video frames and/or still images. The camera 103 may be a digital camera and the image sensor 309 may output captured light as digital data. For example, the image sensor 309 may be a CMOS, NMOS, or Charge-Couple Device (CCD). In some embodiments, the camera 103 may be an analog video camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security monitoring system 100 is contemplated.

The image sensor 309 may be operable to capture light in one or more frequency ranges. For example, the image sensor 309 may be operable to capture light in a range that substantially corresponds to the visible light frequency range. In other examples, the image sensor 309 may be operable to capture light outside the visible light range, such as in the infrared and/or ultraviolet range. In other examples, the camera 103 may have characteristics such that it may be described as being a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features are to capture images and/or video. In some example embodiments, the dedicated camera may perform functions associated with the captured images or video, such as but not limited to processing the video/image data produced by it or by another camera. For example, the dedicated camera may optionally be a security video camera, such as any one of a pan-tilt-zoom video camera, dome video camera, in-ceiling video camera, box video camera, and bullet video camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, physical access control device, etc.

The camera 103 includes one or more processors 313, one or more analytics modules 319, and one or more memory devices 315 coupled to the processors and one or more network interfaces. Regarding the analytics module 319, this generates metadata outputted to the server system 108. In the case of video, the metadata can include, for example, records which describe various detections of objects such as, for instance, pixel locations for the detected object in respect of a first record and a last record for the camera within which the respective metadata is being generated.

Regarding the memory device 315 within the camera 103, this can include a local memory (such as, for example, a random access memory and a cache memory) employed during execution of program instructions. Regarding the processor 313, this executes computer program instructions (such as, for example, an operating system and/or software programs), which can be stored in the memory device 315.

In various embodiments the processor 313 may be implemented by any suitable processing circuit having one or more circuit units, including a digital signal processor (DSP), graphics processing unit (GPU) embedded processor, a visual processing unit or a vision processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 313, may be combined together on one semiconductor chip. For example, the processor 313, the memory device 315 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 315 coupled to the processor 313 is operable to store data and computer program instructions. The memory device 315 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 315 may be operable to store in memory (including store in volatile memory, non-volatile memory, dynamic memory, etc. or any combination thereof). The memory device 315 need not necessarily be a single device, but instead may be comprised of a plurality of separately packaged electronic articles of manufacture inserted into, provided inside, or otherwise provided locally at the camera 103.

As shown in FIG. 2, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Figure 4:
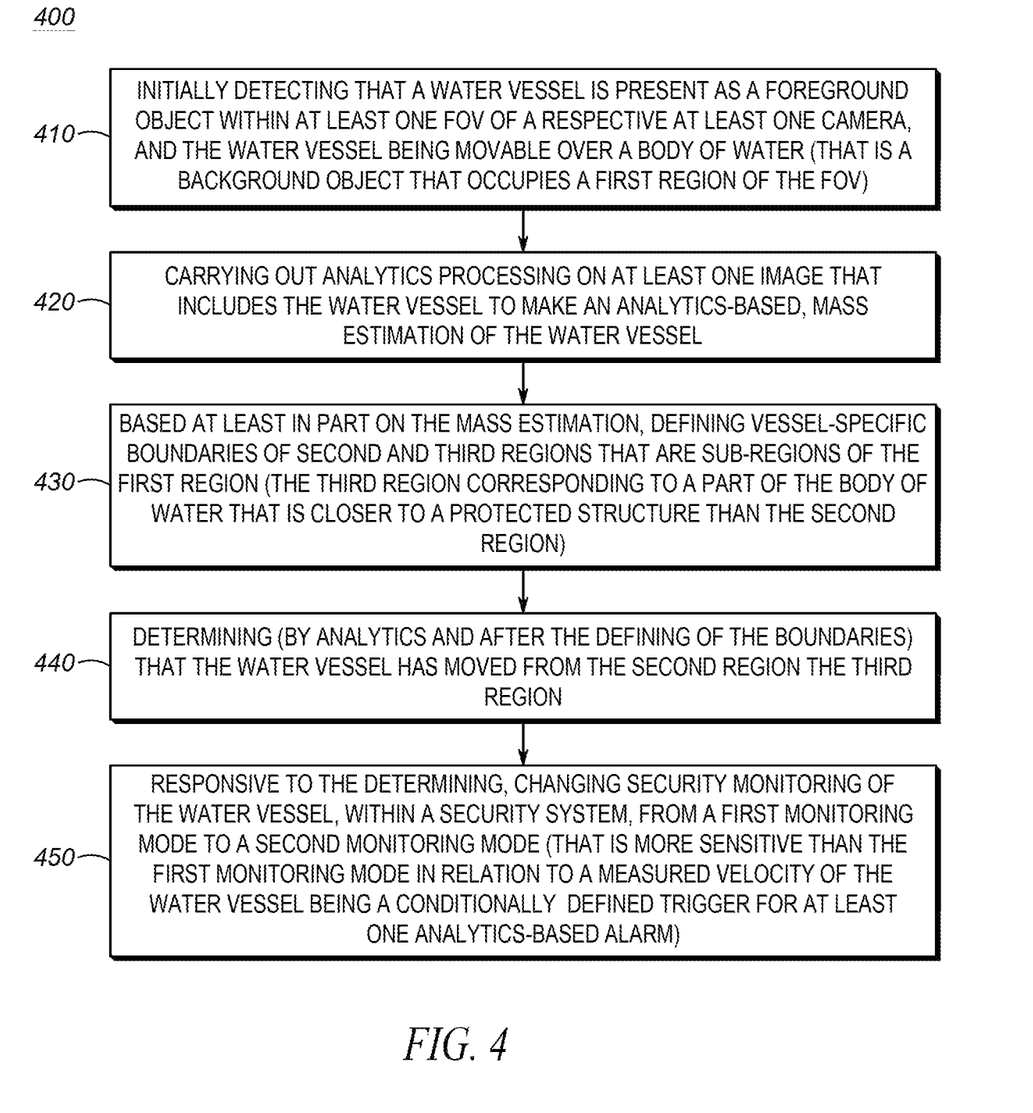
FIG. 4 is a flow chart illustrating a computer-implemented method in accordance with an example embodiment.

Reference is now made to FIG. 4. FIG. 4 is a flow chart illustrating a computer-implemented method 400 in accordance with an example embodiment.

Figure 5:
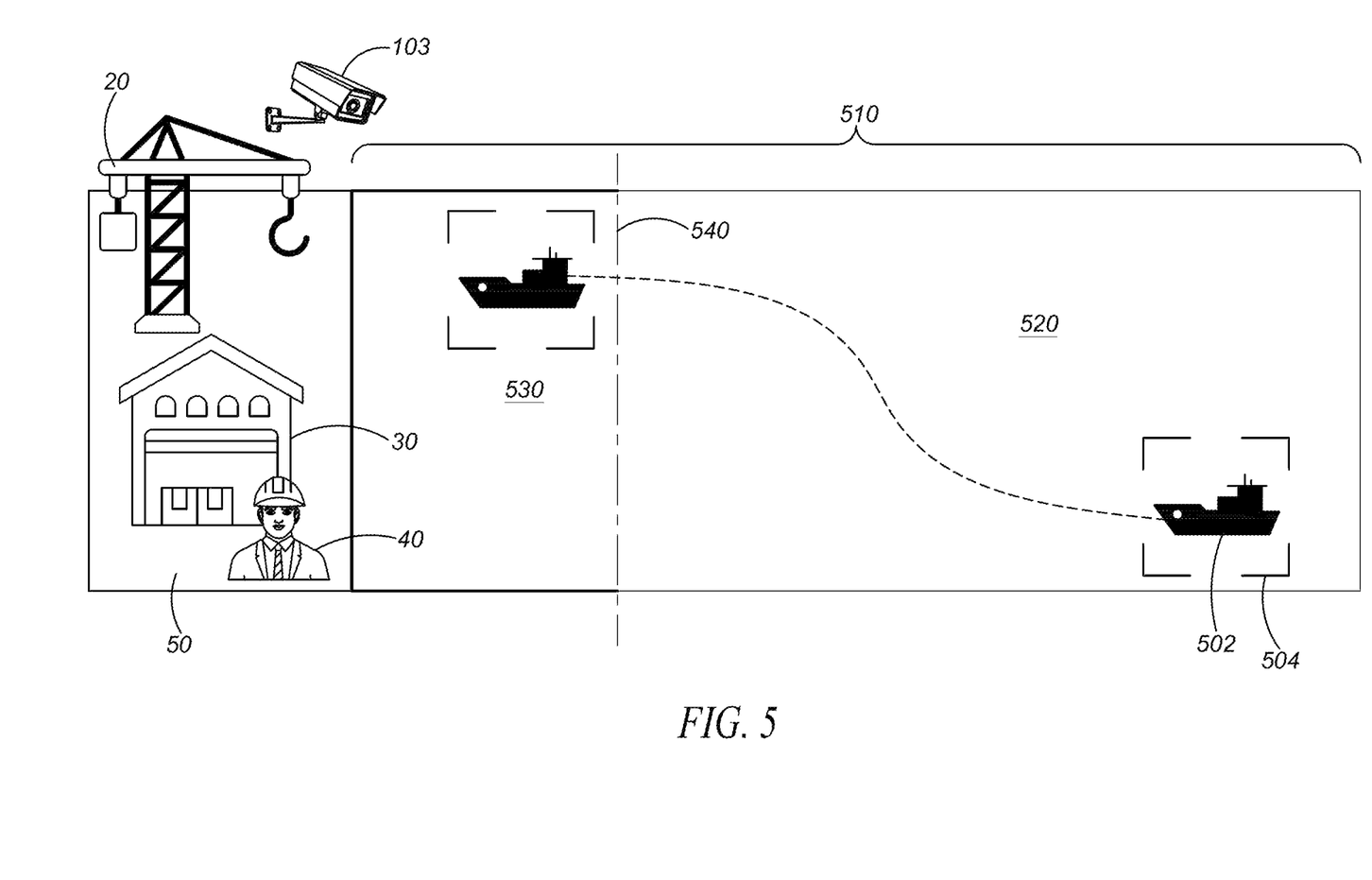
FIG. 5 is a diagram showing a small water vessel approaching a docking area in accordance with an example embodiment.

First, the illustrated computer-implemented method 400 includes initially detecting (410) that a water vessel is present as a foreground object within at least one FOV of a respective at least one camera. Referring to FIG. 5, which is a diagram providing additional example illustrative detail complementary to FIG. 4, water vessel 502 is detected as a foreground object (for example, bounding box 504 appears around the object) and the water vessel 502 is within the FOV of the camera 103.

It will be understood that a water vessel is a vessel that is movable over a body of water, and the body of water consistent with the present example embodiment is a background object that occupies a first region of the FOV of the aforementioned at least one camera. Within FIG. 5 this first region is identified by reference numeral 510.

Next, the illustrated method 400 of FIG. 4 includes carrying out analytics processing (420) on at least one image that includes the water vessel, captured by the camera, to make an analytics-based estimation of the mass of the water vessel. In some examples, one or more of the analytics modules 194 (FIG. 1) may be employed to carry out this analytics processing and analytics-based estimation of the mass. For instance, in at least one example, at least one learning machine may be employed to classify the water vessel 502 based at least in part on object features extracted from the at least one image captured by the camera 103. As will be understood by those skilled in the art, classification of the water vessel 502 provides information about the object (for example, one or more of type, official name and other identifying detail of the water vessel). Examples of types of water vessels include container ship, bulk carrier ship, tanker ship, passenger ship, naval ship, offshore vessel, fishing vessel, barge carrier, research vessel, timber carrier, and livestock carrier. Once classification information is obtained, the estimation of the mass may then be obtained by employing that classification information in any suitable manner that will be readily apparent to one skilled in the art. For example, a look-up table (i.e. a look-up table of a plurality of classified water vessels and corresponding expected masses for the classified water vessels) may be employed, or a reported mass for the identified water vessel may be retrieved from storage such as, for instance, the storage device 190 (FIG. 2) or other suitable storage.

Next, the illustrated method 400 of FIG. 4 includes defining vessel-specific boundaries (430) of second and third regions that are sub-regions of the first region. The defining vessel-specific boundaries may be based at least in part on the analytics-based estimation of the mass of the water vessel. Within FIG. 5, second region 520 and third region 530 corresponding to the vessel 502 are shown.

Regarding the above-mentioned third region, this corresponds to a part of the body of water that is closer to a protected structure than the second region (the protected structure may be located at or physically connected to land abutting the body of water).

Because larger water vessels have larger stopping distances (i.e. with all other factors being equal) it will be understood that the third region will be relatively larger for larger water vessels (and conversely relatively smaller for smaller water vessels). This difference is diagrammatically illustrated in FIG. 6. Large water vessel 608 has a correspondingly larger third region 630 as compared to the third region 530 corresponding to the small water vessel 502. It is also noted that a transition line 640 (transition from second region 620 to the third region 630) is substantially further from land than a similar transition line 540 shown in FIG. 5.

Other factors besides the water vessel size may impact relative size of the above-mentioned third region including, for example, a measured wind speed and direction, and loading of the water vessel (the loading of the water vessel may be already known, or alternatively video analytics may be provided that may be capable of generating an estimate of loading for at least certain types of water vessels).

Figure 6:
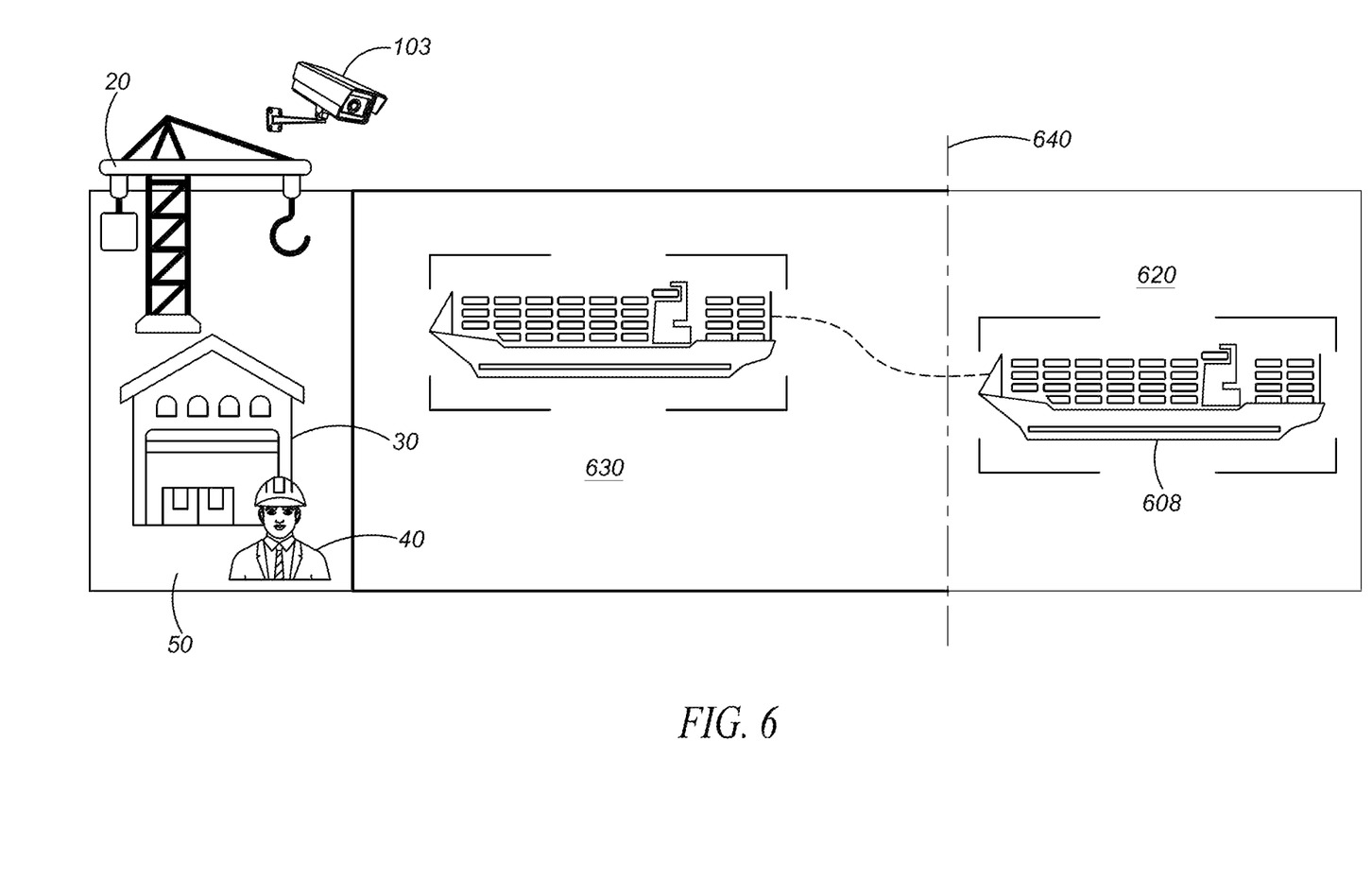
FIG. 6 is a diagram showing a large water vessel approaching a docking area in accordance with an example embodiment.

Still with reference to FIG. 4, following the action 430 (i.e. after the defining of the boundaries) the illustrated method 400 next includes determining (440), by analytics, that the water vessel has moved from the second region to the third region. For example, both the vessels 502 and 608 of FIGS. 5 and 6 are shown in their respective diagrams as being at one point in time fully within the second region, and then at a later point in time fully within the third region.

Finally, and responsive to the action 440, the illustrated method 400 of FIG. 4 includes changing security monitoring (450) of the water vessel, within a security system, from a first monitoring mode to a second monitoring mode. Regarding the second monitoring mode, this mode is more sensitive than the first monitoring mode in relation to a measured velocity of the water vessel being a conditionally defined trigger for at least one analytics-based alarm within the security system.

As mentioned above, analytics-based alarm(s) can be triggered within the security system (such as, for example, the security monitoring system 100 of FIG. 1). For instance, based on detection of the water vessel 502 moving at an excessive velocity within the third region 530, a real-time excessive velocity notification may be generated. The real-time excessive velocity notification to a speaker or screen of an operator of the security system (for example, one or more of the electronic computing devices $104_1$-$104_M$ may include a speaker and/or screen to receive the notification).

Other examples of providing a real-time excessive velocity notification are contemplated. For instance, the real-time excessive velocity notification could be communicating over at least one radio wave signal for audible communications receipt by one or more persons present on the water vessel (for example, the small water vessel 502 or the large water vessel 608).

Other types of analytics-based alarm(s) are contemplated. For example: i) abnormality in the water vessel's direction of travel (for instance, the travel path is such that the water vessel does not appear to be moving towards a designated dock; ii) abnormality in the water vessel's containers (for instance, one or more containers could be slanted in orientation such as to evidence some risk of falling overboard); iii) abnormality in some separation distance (determining that a separation of the water vessel with respect to port infrastructure or some other water vessel is too small).

Figure 7:
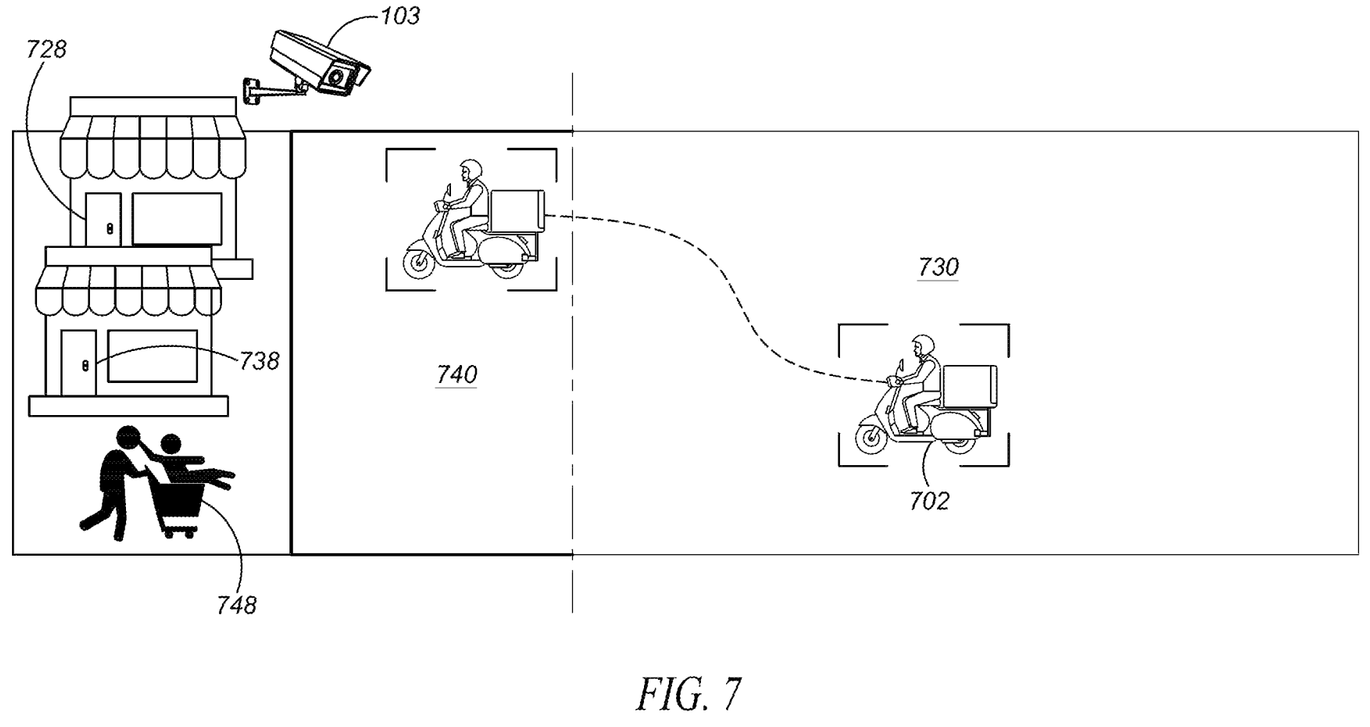
FIG. 7 is a diagram showing a small vehicle approaching a parking area in accordance with an example embodiment.
Figure 8:
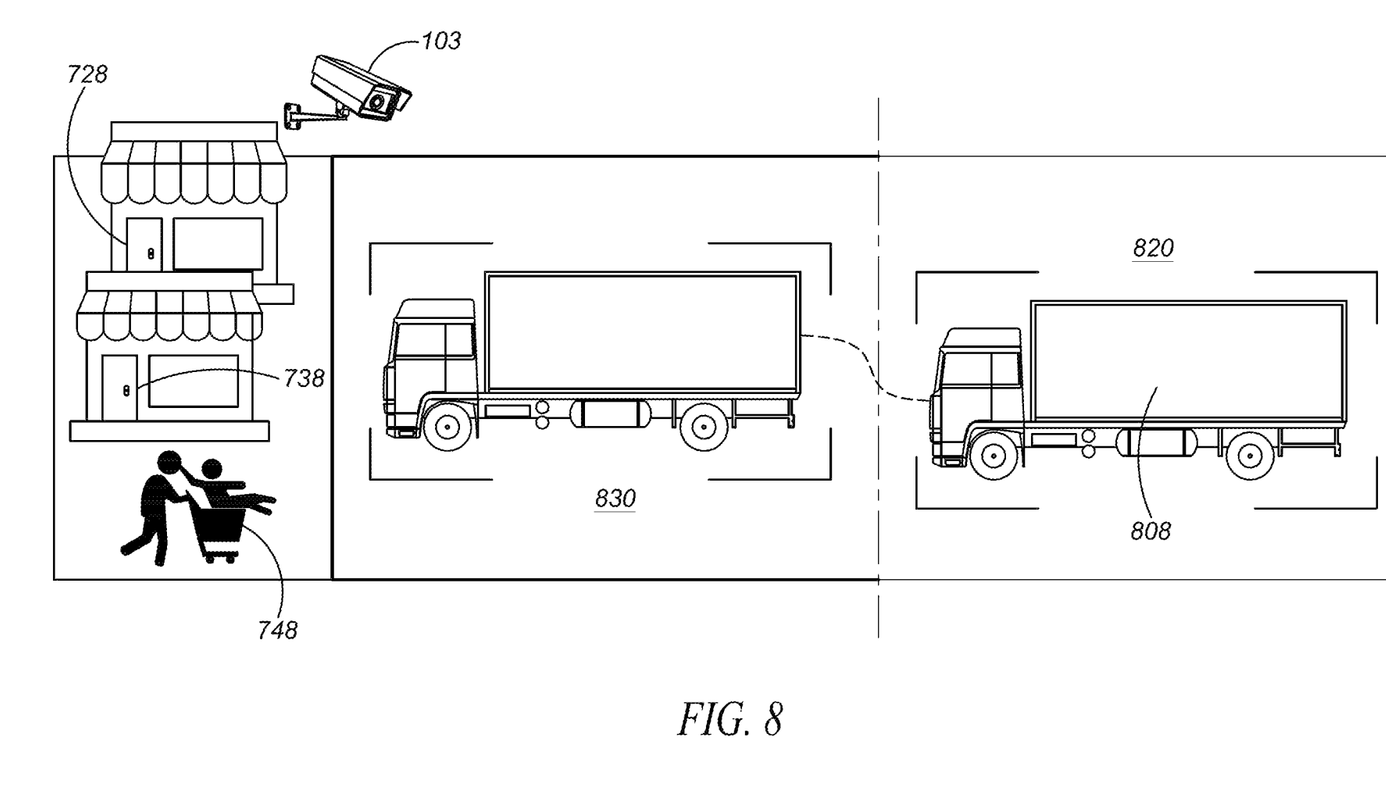
FIG. 8 is a diagram showing a large vehicle approaching a parking area in accordance with an example embodiment.

Not all example embodiments are limited to water vessels. In this regard, FIG. 7 is a diagram showing a small, motorized vehicle 702 (motorcycle or motorized tricycle) approaching a parking area (geographically proximate property structures 728 and 738 and people 748) in accordance with an example embodiment. Illustrated second region 730 and third region 740 may be similar to the second and third regions that were previously described in relation to the water vessel example embodiments. Further in relation to the motorized vehicle context, FIG. 8 is a diagram showing a large vehicle 808 (truck with trailer) approaching a parking area (same parking area of FIG. 7) in accordance with an example embodiment. Illustrated second region 820 and third region 830 may be similar to the second and third regions that were previously described in relation to the water vessel example embodiments.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and a human mind cannot define and set region boundaries for application to an FOV of a camera, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
    initially detecting that a water vessel, having a mass and movable over a body of water, is present as a foreground object within at least one Field Of View (FOV) of a respective at least one camera, wherein the body of water is a background object occupying a correspondingly sized first region within the FOV;
    carrying out analytics processing on at least one image that includes the water vessel, captured by the camera, to make an analytics-based estimation of the mass of the water vessel;
    based at least in part on the analytics-based estimation of the mass of the water vessel, defining vessel-specific boundaries that divide the first region into second and third regions that are sub-regions of the first region, wherein:
        the third region corresponds to a part of the body of water that is closer to a protected structure than the second region, and
        the protected structure is located at or physically connected to land abutting the body of water;
    determining, by analytics and after the defining of the vessel-specific boundaries of the second and third regions, that the water vessel has moved from the second region to the third region; and
    responsive to the determining, changing security monitoring of the water vessel, within a security system, from a first monitoring mode to a second monitoring mode,
    wherein the second monitoring mode is more sensitive than the first monitoring mode in relation to at least one of a measured velocity of the water vessel and a travel path of the water vessel being a conditionally defined trigger for at least one analytics-based alarm within the security system.

2. The computer-implemented method of claim 1 wherein the water vessel is one of a container ship, a bulk carrier ship, a tanker ship, a passenger ship, a naval ship, an offshore vessel, a fishing vessel, a barge carrier, a research vessel, a timber carrier, and a livestock carrier.

3. The computer-implemented method of claim 1 wherein the carrying out of the analytics processing includes employing at least one learning machine to classify the water vessel based at least in part on object features extracted from the at least one image.

4. The computer-implemented method of claim 3 wherein the analytics-based estimation of mass is obtained by employing a look-up table of a plurality of classified water vessels and corresponding expected masses for the classified water vessels.

5. The computer-implemented method of claim 1 further comprising identifying a detection, while the security system is operating in the second monitoring mode, that the water vessel is moving at an excessive velocity.

6. The computer-implemented method of claim 5 further comprising generating, based on the detection of the water vessel moving at the excessive velocity, a real-time excessive velocity notification.

7. The computer-implemented method of claim 6 further comprising communicating the real-time excessive velocity notification to a speaker or screen of an operator of the security system.

8. The computer-implemented method of claim 6 further comprising communicating the real-time excessive velocity notification over at least one radio wave signal for audible communications receipt by one or more persons present on the water vessel.

9. The computer-implemented method of claim 1 wherein the carrying out analytics processing on the at least one image comprises carrying out video analytics processing on video, and the determining by analytics comprising determining by video analytics.

10. The computer-implemented method of claim 1 wherein the security system calculates the measured velocity of the water vessel by video analytics processing of video captured by the camera.

11. A security system comprising:
at least one camera configured to capture images that include a water vessel; and
at least one processor communicatively coupled to the at least one camera, the at least one processor being configured to carry out a method that includes:
initially detecting that the water vessel, having a mass and movable over a body of water, is present as a foreground object within at least one Field Of View (FOV) of the respective at least one camera, wherein the body of water is a background object occupying a correspondingly sized first region within the FOV;
carrying out analytics processing on at least one image of the images to make an analytics-based estimation of the mass of the water vessel;
based at least in part on the analytics-based estimation of the mass of the water vessel, defining vessel-specific boundaries that divide the first region into second and third regions that are sub-regions of the first region, wherein:
the third region corresponds to a part of the body of water that is closer to a protected structure than the second region, and
the protected structure is located at or physically connected to land abutting the body of water;
determining, by analytics and after the defining of the vessel-specific boundaries of the second and third regions, that the water vessel has moved from the second region to the third region; and
responsive to the determining, changing security monitoring of the water vessel, within the security system, from a first monitoring mode to a second monitoring mode,
wherein the second monitoring mode is more sensitive than the first monitoring mode in relation to at least one of a measured velocity of the water vessel and a travel path of the water vessel being a conditionally defined trigger for at least one analytics-based alarm within the security system.

12. The security system of claim 11 wherein the water vessel is one of a container ship, a bulk carrier ship, a tanker ship, a passenger ship, a naval ship, an offshore vessel, a fishing vessel, a barge carrier, a research vessel, a timber carrier, and a livestock carrier.

13. The security system of claim 11 wherein the carrying out of the analytics processing includes employing at least one learning machine to classify the water vessel based at least in part on object features extracted from the at least one image.

14. The security system of claim 13 wherein the analytics-based estimation of mass is obtained by employing a look-up table of a plurality of classified water vessels and corresponding expected masses for the classified water vessels.

15. The security system of claim 11 wherein the method further includes identifying a detection, while the security system is operating in the second monitoring mode, that the water vessel is moving at an excessive velocity.

16. The security system of claim 15 wherein the method further includes generating, based on the detection of the water vessel moving at the excessive velocity, a real-time excessive velocity notification.

17. The security system of claim 16 further comprising:
a speaker or screen communicatively coupled to the at least one processor, and
wherein the method further includes communicating the real-time excessive velocity notification to the speaker or screen.

18. The security system of claim 16 further comprising a transmitter communicatively coupled to the at least one processor, the transmitter being configured to communicate the real-time excessive velocity notification over at least one radio wave signal for audible communications receipt by one or more persons present on the water vessel.

19. The security system of claim 11 wherein the carrying out analytics processing on the at least one image comprises carrying out video analytics processing on video, and the determining by analytics comprising determining by video analytics.

20. The security system of claim 11 wherein the at least one processor is further configured to calculate the measured velocity of the water vessel by video analytics processing of video captured by the camera.

* * * * *